M. L. PACKER.
COMBINED GAS AND COAL RANGE.
APPLICATION FILED JULY 31, 1911.

1,193,714.

Patented Aug. 8, 1916.
3 SHEETS—SHEET 1.

Witnesses

Inventor
Mortimer L. Packer
By C. C. Shepherd
Attorney

M. L. PACKER.
COMBINED GAS AND COAL RANGE.
APPLICATION FILED JULY 31, 1911.

1,193,714.

Patented Aug. 8, 1916.
3 SHEETS—SHEET 2.

Witnesses
W. A. Bock
A. L. Phelps

Inventor
Mortimer L. Packer
By C. C. Shepherd
Attorney

M. L. PACKER.
COMBINED GAS AND COAL RANGE.
APPLICATION FILED JULY 31, 1911.
1,193,714.
Patented Aug. 8, 1916.
3 SHEETS—SHEET 3.
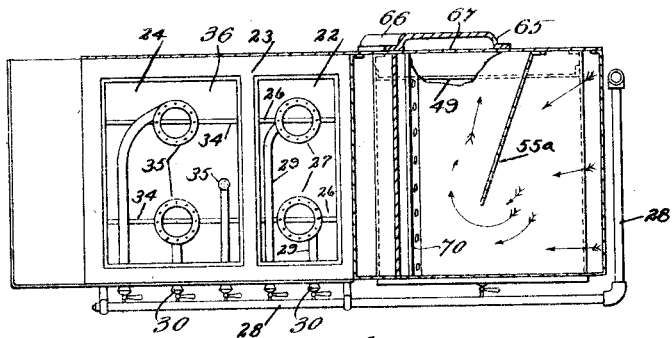
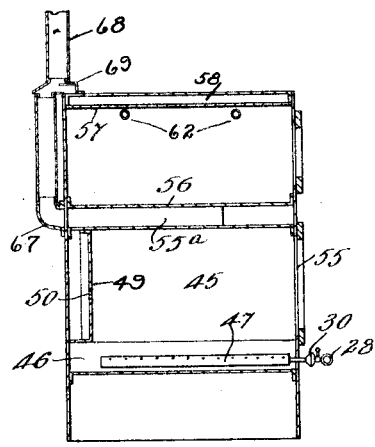
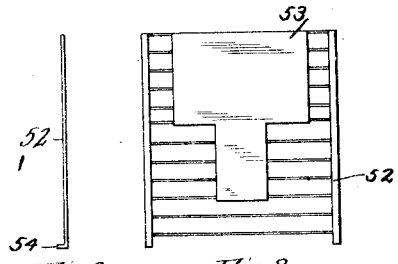
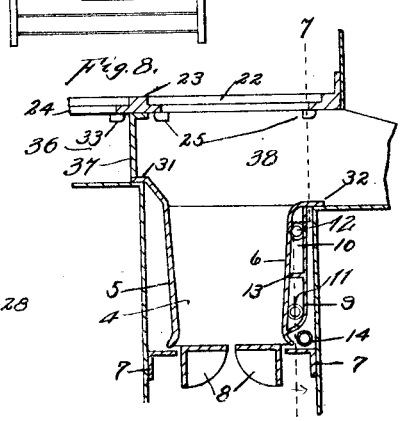
Witnesses
Inventor
Mortimer L. Packer
By C. C. Shepherd
Attorney

UNITED STATES PATENT OFFICE.

MORTIMER L. PACKER, OF COLUMBUS, OHIO.

COMBINED GAS AND COAL RANGE.

1,193,714.     Specification of Letters Patent.     Patented Aug. 8, 1916.

Application filed July 31, 1911.  Serial No. 641,505.

*To all whom it may concern:*

Be it known that I, MORTIMER L. PACKER, a citizen of the United States, residing at Columbus, in the county of Franklin and State of Ohio, have invented certain new and useful Improvements in Combined Gas and Coal Ranges, of which the following is a specification.

My invention is an improvement in a combined gas and coal range, and is particularly designed in an endeavor to remedy numerous existing difficulties in devices of this type, with particular reference to the utilization of the natural tendencies of products of combustion in their course of travel through the range.

The main object of my invention, therefore, resides in the provision of a structure adaptable for use with either solid or gaseous fuel. In carrying forth this object, I have provided a damping means operable when in one position to break the communication of the gas heating means with the flue pipe to enable the escape of the products of combustion from the solid fuel heating means after they have passed entirely around the oven. Likewise, when this damping means is in the other position, it permits a direct flow of the products of combustion from the solid fuel heating means into the flue and also establishes a communication between the flue pipe and the interior of the oven.

Figure 1:
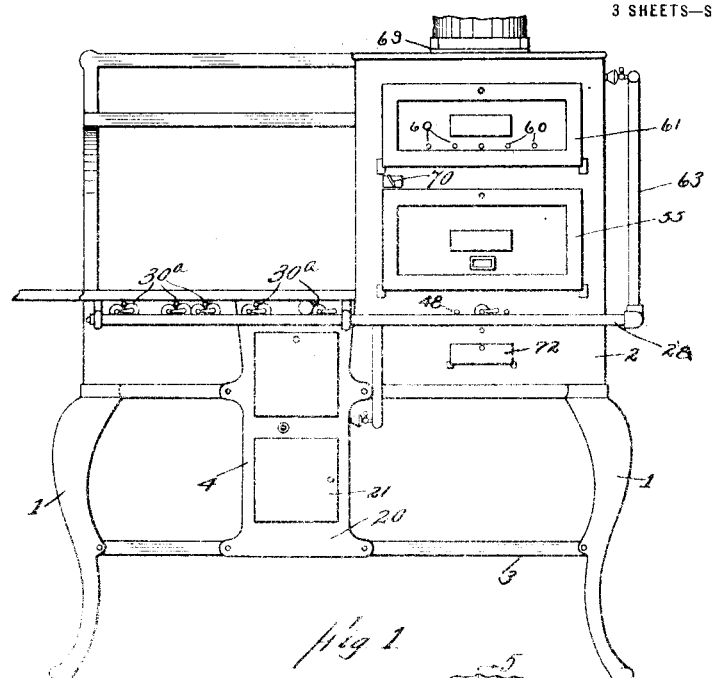
Figure 2:
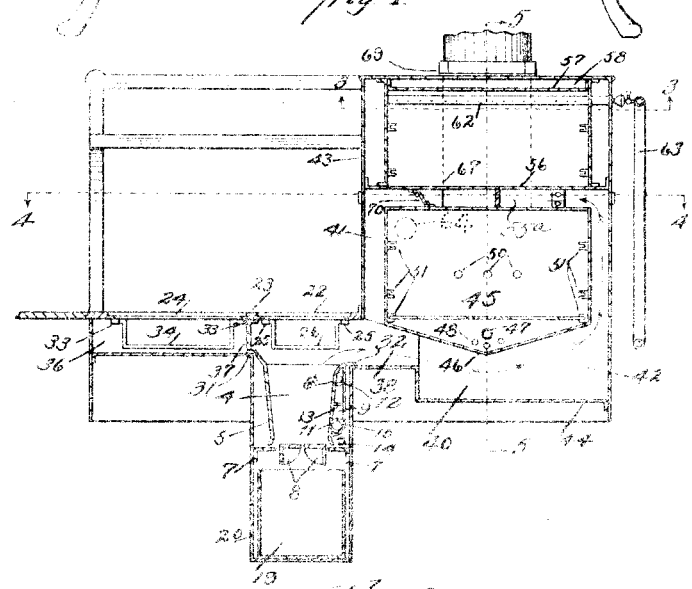
Figure 10:
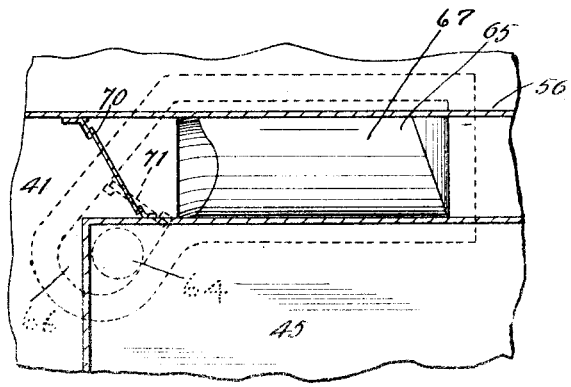
Figure 11:
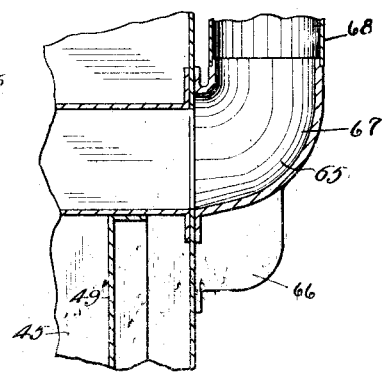
Figure 12:
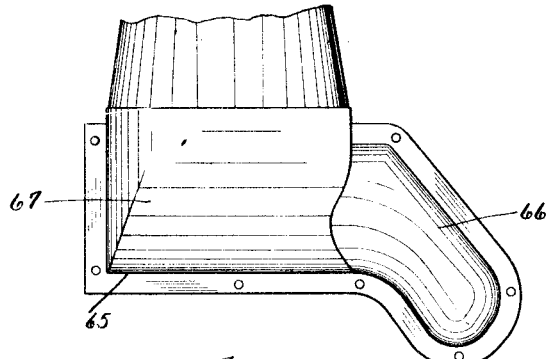
Figure 13:
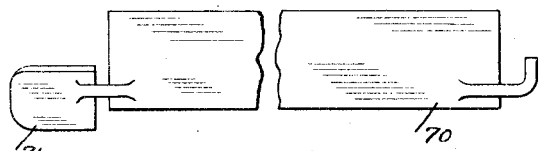
Figure 14:
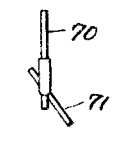
Figure 3:
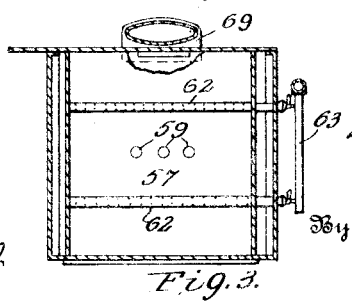

Referring to the accompanying drawings, in which similar characters of reference designate corresponding parts: Figure 1 is a front elevation of my combined gas and coal range, Fig. 2 is a vertical longitudinal section taken through Fig. 1, Fig. 3 is a section taken in line 3—3 of Fig. 2, looking in the direction of the arrows, Fig. 4 is a section taken on line 4—4 of Fig. 2 and looking in the direction of the arrows, Fig. 5 is a section on line 5—5 of Fig. 2 looking in the direction of the arrows and showing the section complete, Fig. 6 is a vertical transverse section taken through my improved type of fire box, Fig. 7 is a section taken on line 7—7 of Fig. 8, Fig. 8 is a detail plan of an improved type of oven shelf utilized by me, Fig. 9 is an edge view of such shelf, Fig. 10 is a detail view in section showing a peculiar structure of passage for the heat fumes, Fig. 11 is a projected section of the detail shown in Fig. 12, Fig. 12 is a rear elevation of the casting used in the structure shown in Figs. 12 and 13, Fig. 13 is an elevation showing the structure of damper utilized by me, Fig. 14 is an end elevation of the damper.

My combination range comprises essentially, legs 1 and a body portion 2 and preferably carries a shelf 3, which has an additional function in that it assists in supporting the heat dispensing structure. That part of my range which has been designated the heat dispensing unit, is best illustrated by the structures shown in parts in Figs. 2, 6 and 7. It comprises primarily a fire box structure 4 having walls 5 and 6, bed plates 7 and rocker bars 8. These walls of the fire box may be varied in form, but the wall 6 is desirably provided with a supplemental wall 9 forming a chamber 10 which is provided with an inlet pipe 11 and an outlet pipe 12. These pipes 11 and 12 are for the purpose of introducing and withdrawing water from the chamber 10 with the object in view of heating such water in its passage through the chamber and such passage is lengthened by the provision of a horizontal flange or baffle 13. It will be seen that, when the fire box is in use, any water passing through the chamber 10, will necessarily be heated. This heating action may be further enhanced by the lighting of a burner 14 disposed without the fire box and beneath the chamber 10 and such burner may be used either independently or simultaneously with the use of the fire box. Below the fire box, I desirably mount an ash receptacle of any type as at 19, which receptacle is supported within the casing 20 preferably having some type of door in its front face as at 21.

The mouth of the fire box is desirably in alinement with an opening 22 in a lid supporting frame 23 further provided with an adjacent opening 24. Carried by the frame 23 within the opening 22 are lugs 25 for carrying brackets 26 serving as supports for the detachable burners 27 which extend through the wall of the range just above the fire box and are connected to the gas supply pipe 28 by the short pipes 29 upon the burners and bell mouths 30. The walls 5 and 6 of the fire box are provided with flange fingers 31 and 32 for assisting to support them in vertical and normal position. The opening 24 of the frame 23 is likewise provided with lugs 33 for carrying brackets 34 serving as supplemental supports for the gas burners 35 having short pipes and bell mouths and being substantially similar to the burners 27. The openings in the wall of the range which partially support the gas burners 27 and 35, are adapted to be closed by the pivoted caps 30ª shown in Fig. 1 of the drawings. The pocket beneath the opening 24 may be designated 36 and is separated from the fire box by a wall 37 which connects at its rear end with a wall 38 forming a longitudinal passage 39 in the rear of the fire box, shown best in Figs. 2, 6 and 7. Lids may or may not be placed upon the frame 23 to cover the openings 22 and 24, as desired.

The fire box above the wall 6 and the passage 39 at the rear of the fire box and leading from the pocket 36, communicate with a passage 40 having a vertical branch 41 and a substantially horizontal continuation 42. The branch passages 41 and 42 are formed by the provision of the vertical wall 43 and the horizontal base 44 which contain the oven 45.

The oven 45 is substantially rectangular in cross section with the exception that its base is of trough shape as at 46 and receives the burner pipe 47 extending from the front to the rear of the range and having small openings or air inlet ducts 48 in the rear and front wall of the range, so that air may be admitted to support combustion. The rear wall 49 of the oven 45 is desirably spaced from the rear wall of the range and is provided with apertures 50 for the escape of the products of combustion when the gas burner 47 is being utilized. Within the oven 45 and disposed in alinement upon the vertical walls thereof are guides 51 for the reception of shelves or racks. The rack which I prefer to use in this invention, is shown best in Figs. 8 and 9 and comprises a body portion 52 and a spreader member 53, the said body portion having its forward end provided with downturned lips 54, these lips being formed upon the body portion so that the closing of the oven door 55 will serve to force the rack into proper position, if it be extended outwardly.

Mounted above the oven 45 and spaced therefrom is a partition 56 forming the base wall of a broiler oven. In this space I desirably provide a baffle plate 55ª, shown in Fig. 4 and extending from the rear wall of the range forwardly and at an angle, for a purpose to be hereinafter described. This broiler oven has a false top 57 whereby there is provided a horizontal chamber 58 having communication with the broiler by holes 59 in the false top 57. Inlet apertures 60 are provided in the front of the broiler oven just below the name plate of the door 61, and burners 62 extend across the said broiler oven, being fed by a gas supply pipe 63, which forms a part of the gas supply pipe 28 hitherto mentioned.

The rear wall of the range is provided at a point near the upper left hand corner of the oven 45, with an outlet aperture 64. Referring to Figs. 10, 11 and 12, it will be apparent that this aperture 64 leads into a casting 65 which is mounted upon the outer surface of the rear wall of the range and together with such rear wall, forms a passage 66 normally communicating with a passage 67 leading into a chimney pipe 68 which extends upwardly in the rear of the range and which communicates with the chamber 58 formed by the false top 57 above the broiler oven, such communication being effected through the medium of a casting 69, shown in Fig. 5. The communication effected with this chamber 58 constitutes a draft checking apparatus, the operation of which will be hereinafter described.

Mounted upon the upper wall of the oven 45 near the upper left-hand corner thereof is a hand operated damper 70 of the structure shown in Figs. 13 and 14 and provided at its rear end with a supplemental damper 71 adapted to control the communication between the passages 66 and 67 in the casting 65.

In operation as a coal stove, the burners 27 are removed and the pivoted caps are swung into position to close the holes through which the pipes of said burners have passed, whereupon a fire is built upon the rocking grate bars 8. This fire may be either of wood or of coal. After the fire is built and lighted, a lid may be placed over the opening 22 whereupon the products of combustion will take their natural course. When the fire is first lighted, the damper 70 is desirably lowered and permits the passage of the products of combustion up the vertical passage 41 and over the top of the oven 45 directly into the passage 67 forming the mouth of the chimney 68. It is advisable to leave this initial draft open until the fire has obtained a proper start. The damper is then closed, whereupon the products of combustion are shut off from their directly upward ascent and thereupon take the path of least resistance, which is through the passage 42 beneath the oven and up upon the other side of the oven to the space above the oven, finally passing to the passage 67. If it is desired to throw the heating effect upon the oven, the burners 35 in the pocket 36 may be lighted and the opening 24 covered. When this is done, the heat units pass into the passage 39 in the rear of the fire box and are delivered to the passage 42, where they join with the products from the fire box, or it will be understood, that the fire box need not be utilized and with the burners 35 lighted and the damper in closed position, the heat units will pass through the passage 39 and directly into the passage 42 and up around the oven into the passage 67 forming the inlet of the chimney pipe. In either of these three operations, it will be apparent that the damper is closed, that is when the fire has secured sufficient start, and that there is no access to the interior of the oven except through the ducts 48, which are necessary to support combustion when using oven for gas. Thus it will be seen that there is no danger of soot backing down into the oven. This will be more apparent when it is understood that the side walls, the upper wall and the lower wall of the oven 45 are extended rearwardly to the rear wall of the range and the aperture 64 is in the rear wall of the range and not the false back 49 to thus communicate with the box-like chamber formed between the rear wall of the oven and the rear wall of the range by such upper, lower and side walls. Furthermore, the noxious gases will be shut off from any possible passage downwardly into the casting 65 and thence to this box-like chamber by the supplemental damper 71. It will be further apparent that the rising heat units in their passage across the upper wall of the oven, will be directed forwardly by the baffle 55ª so that they are slightly deflected from the direct path of their outlet and are given full effect upon the straight upper wall of the oven. When using the fire box, it is desirable to provide a draft checking device and this is effected by the provision of the casting 69 communicating with the chamber 58 in the broiler and operating in the following manner. If the heating operation of the fire box becomes too great, it is only necessary to open the door of the broiler oven, whereupon a current of air sweeps into the broiler oven, through the holes 59 in the upper wall thereof and into the casing 69, which sudden influx of air into the chimney pipe very appreciably checks the draft and in this manner checks the fire in the fire box.

When it is desired to use the gas burner 47 within the oven 45 to the exclusion of the solid fuel heating means, the damper 70 is swung to the opposite position, whereby the portion 71 is moved to such position that the space formed by the false back 49 is in communication with the flue pipe. The products of combustion then pass from the gas burner 47 through the apertures 50 into the box-like chamber formed between the rear wall of the range and the false back 49, from whence they pass into the chimney through the aperture 64 and casing 65. As above explained when the damper 70 is swung back to the position shown in Figs. 1 and 10, the interior of the oven is not in communication with the outlet flue pipe and consequently the burner 47 should not be used. In this event, the products of combustion from the fire box 4 are forced completely around the oven and are allowed to pass out through the opening 67.

What I claim, is—

1. A combined gas and coal range comprising a solid fuel heating means, a gas heating means, an oven arranged in superheating relation and laterally disposed with respect to said first named means, a casing surrounding said oven to form a space for the circulation of the heat products from said solid fuel means, an outlet flue pipe communicating with the space formed by said casing adjacent the top of said oven, a damping structure operable when in one position to allow the heat products to pass into said pipe by a passage up one side of said oven and when in the other position, up the other side of said oven, and a baffle plate on the top of said oven extending forwardly from the rear thereof between the flue outlet opening and the last-named passageway to force the products toward the front of the top of said oven.

2. A combined gas and coal range comprising a solid fuel heating means, an oven, a casing surrounding said oven to form a space for the circulation of the heat products from said means, a gas heating means within said oven, an outlet flue pipe connected to carry away the products from either of said means, and a single damper operable when in one position to break the communication of said gas heating means with said flue when the products from said solid fuel heating means are forced entirely around the space formed by said casing and when in the other position to permit a direct flow from the solid fuel heating means into said flue.

3. A combined gas and coal range comprising a solid fuel heating means, an oven, a casing surrounding said oven to form a space for the circulation of the heat products from said means, a gas heating means within said oven, an outlet flue pipe connected to carry away the products from either of said means, a damping device operable when in one position to break the communication of said gas heating means with said flue when the products from said solid fuel heating means are forced entirely around the space formed by said casing and when in the other position to permit a direct flow from the solid fuel heating means into said flue, and a single throw lever for effecting the movements of said device.

4. A combined gas and coal range comprising a solid fuel heating means, superposed ovens, said ovens being out of communication with each other, an outlet flue pipe communicating with both of said ovens and being also arranged to carry away the products of combustion from said solid fuel heating means, and a gas heating means within each of said ovens.

5. A combined gas and coal range comprising a solid fuel heating means, an oven, a casing surrounding said oven to form a space for the circulation of the heat products from said means, a gas heating means within said oven, an outlet flue pipe connected to be in communication with the interior of said oven and also with the space formed by said casing, and a damper located at the top of said oven in the space formed by said casing and extending into said pipe to break the communication of said pipe with the interior of said oven when desired, said damper being also arranged when in one position to permit a direct flow from said solid fuel heating means to said pipe and when in the other position to deflect the products of combustion completely around said oven.

6. A combined gas and coal range comprising a solid fuel heating means, an oven, a casing surrounding said oven to form a space for the circulation of the heat products from said means, a gas heating means within said oven, a false back in said oven to form its rear wall and a completely inclosed space to the rear of said back, said false back being apertured, an outlet flue pipe connected to be in communication with the space formed by said false back and also with the space formed by said casing, a damper located at the top of said oven in the space formed by said casing and between said flue outlet and the solid fuel heating means to permit either a direct flow from the solid fuel means to said pipe or forcing the products of combustion completely around said oven to said pipe, and an extension on said damper extending into said flue pipe and movable into a position to break its communication with the space formed by said false back if desired.

In testimony whereof I affix my signature in presence of two witnesses.

MORTIMER L. PACKER.

Witnesses:
C. C. SHEPHERD,
ROSCOE C. LORENTZ.